United States Patent
Moden

(10) Patent No.: US 9,606,997 B2
(45) Date of Patent: *Mar. 28, 2017

(54) INFERRED OPERATIONS FOR DATA ANALYSIS

(71) Applicant: International Business Machines Corporation, Armonk, NY (US)

(72) Inventor: Colin A. Moden, Kemptville (CA)

(73) Assignee: International Business Machines Corporation, Armonk, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/551,591

(22) Filed: Nov. 24, 2014

(65) Prior Publication Data

US 2015/0269172 A1    Sep. 24, 2015

Related U.S. Application Data

(63) Continuation of application No. 14/219,100, filed on Mar. 19, 2014.

(51) Int. Cl.
*G06F 17/30*    (2006.01)

(52) U.S. Cl.
CPC .. *G06F 17/30082* (2013.01); *G06F 17/30303* (2013.01); *G06F 17/30315* (2013.01); *G06F 17/30507* (2013.01); *G06F 17/30864* (2013.01); *G06F 17/30997* (2013.01)

(58) Field of Classification Search
CPC ................................................ G06F 17/30507
See application file for complete search history.

(56) References Cited

U.S. PATENT DOCUMENTS

| | | | |
|---|---|---|---|
| 6,321,217 B1 | 11/2001 | Maeda et al. | |
| 6,609,123 B1 | 8/2003 | Cazemier et al. | |
| 7,296,040 B2 | 11/2007 | Cazemier et al. | |
| 7,716,212 B2 | 5/2010 | Azizi et al. | |

(Continued)

FOREIGN PATENT DOCUMENTS

| | | |
|---|---|---|
| EP | 0997834 A2 | 5/2000 |
| EP | 1081609 A2 | 3/2001 |

(Continued)

OTHER PUBLICATIONS

Kutukcuoglu, "General Framework for Rule Based Calculations", finaquant, Apr. 9, 2012, pp. 1-5. http://finaquant.com/general-framework-for-rule-based-calculations/873.

(Continued)

*Primary Examiner* — Grace Park
(74) *Attorney, Agent, or Firm* — Jared L. Montanaro

(57) ABSTRACT

A method may include importing into a memory a set of data into a data structure having a plurality of rows and a plurality of columns, and metadata for the set of data. A rules engine determines one or more operations on particular columns of the set of data according to a set of rules. A rule may include a condition defined in terms of the metadata. Determined operations are input into a data analysis tool, the determined operations are performed, and results of the operations are displayed. The rule can include comparing a metadata attribute of a first column with a metadata attribute of a second column; comparing a metadata attribute of a first column with a metadata attribute associated with the rule; or comparing a first scope of a first column with a second scope of a second column.

11 Claims, 5 Drawing Sheets

(56) References Cited

U.S. PATENT DOCUMENTS

| | | | |
|---|---|---|---|
| 7,953,694 | B2 | 5/2011 | Colossi et al. |
| 8,401,987 | B2 | 3/2013 | Agrawal et al. |
| 8,694,540 | B1 | 4/2014 | Lin et al. |
| 2004/0059659 | A1 | 3/2004 | Safaei et al. |
| 2005/0240615 | A1 | 10/2005 | Barsness et al. |
| 2009/0319880 | A1 | 12/2009 | Collie et al. |
| 2015/0073871 | A1 | 3/2015 | Hu et al. |
| 2015/0269281 | A1 | 9/2015 | Moden |

FOREIGN PATENT DOCUMENTS

| | | |
|---|---|---|
| EP | 1081611 A2 | 3/2001 |
| WO | 0227533 A1 | 4/2002 |
| WO | 2005033980 A1 | 4/2005 |

OTHER PUBLICATIONS

Moriarty, "Business Rule Analysis", Database Programming & Design, Apr. 1993, pp. 1-3. http://www.inastrol.com/articles/9304.htm.

Vasilecas, et al., "Business rule based data analysis for decision support and automation", International Conference on Computer Systems and Technologies—CompSysTech'06, pp. II.9-1-II.9-6 http://www.google.co.in/url?sa=t&rct=j&q=&esrc=s&source=web&cd=1&ved=0CCsQFjAA&url=http%3A%2F%2Fciteseerx.ist.psu.edu%2Fviewdoc%2Fdownload%3Fdoi%3D10.1.1.94.928%26rep%3Drep1%26type%3Dpdf&ei=0dWRUdmKKYXxrQeKw4C4Aw&usg=AFQjCNFIcMNZ72RFD1MSQWLUcdrWZcd5tA&bvm=bv.46471029.

Vincent, et al., "Fair Isaac Blaze Advisor Structured Rules Language—a commercial rules representation", W3C Workshop on Rule Languages for Interoperability, FairIsaac, Mar. 2005, pp. 1-5 http://www.w3.org/2004/12/rules-ws/paper/55/.

Zhang, et al, "Extracting Dimensions for OLAP on Multidimensional Text Databases", Web Information Systems and Mining: Lecture Notes in Computer Science, 2011, pp. 272-281, Part 2, vol. 6988, © Springer-Verlag Berlin Heidelberg 2011. http://link.springer.com/chapter/10.1007/978-3-642-23982-3_34.

Moden, C., "Inferred Operations for Data Analysis," U.S. Appl. No. 14/219,100, filed Mar. 19, 2014.

Vasilecas, et al., "Business rule based data analysis for decision support and automation", International Conference on Computer Systems and Technologies—CompSysTech'06, pp. II.9-1-II.9-6, Jan. 2006, http://www.google.co.in/url?sa=t&rct=j&q=&esrc=s&source=web&cd=1&ved=0CCsQFjAA&url=http%3A%2F%2Fciteseerx.ist.psu.edu%2Fviewdoc%2Fdownload%3Fdoi%3D10.1.1.94.928%26rep%3Drep1%26type%3Dpdf&ei=0dWRUdmKKYXxrQeKw4C4Aw&usg=AFQjCNFIcMNZ72RFD1MSQWLUcdrWZcd5tA&bvm=bv.46471029.

INFERRED OPERATIONS FOR DATA ANALYSIS

BACKGROUND

The present disclosure relates to analysis of data stored in a computer database using a data analysis tool, and more specifically, to inferring or suggesting particular operations that may be performed by the data analysis tool.

In many types of organizations, organizational data analysts, e.g., business analysts, are employed to analyze data stored in computer databases. The business analyst analyzes data in order to discover information that may be useful for a variety of purposes, such as to support decision making. In general, the analyst selects a set of data from one or more databases, imports the selected data into an analysis tool, i.e., a computer software application, and then determines operations or calculations to be preformed on the data using the analysis tool. However, it can be time consuming to input formulas defining the operations into the analysis tool. In addition, determining suitable or appropriate calculations may require the skill of an experienced business analyst, but often someone other than an experienced analyst may be the one using the analysis tool and that individual may only have a general idea of what calculations may be useful.

SUMMARY

An embodiment is directed to computer-implemented method. The method may include importing a set of data into a data structure in a memory. The data structure has a plurality of rows and a plurality of columns. The method may also include importing metadata for the set of data into the memory. In addition, the method may include determining, by a rules engine, one or more operations on particular columns of the set of data according to a set of rules. A rule of the set of rules may include a condition defined in terms of the metadata. The method may include inputting the determined operations into a data analysis tool and performing the determined operations by the data analysis tool. In addition, the method may include presenting results of the operations on a display device as an additional column to the plurality of columns.

In various embodiments, the rule includes comparing a metadata attribute of a first column with a metadata attribute of a second column. In other embodiments, the rule includes comparing a metadata attribute of a first column with a metadata attribute associated with the rule. In addition in an embodiment, the metadata includes a dimension of a first column and a dimension of a second column, and the rule includes comparing the respective scopes (using the respective dimensions) of the first and second columns. In various embodiments, the rule includes comparing a first scope of a first column with a second scope of a second column. In still other embodiments, the rule determines that a first column includes data of a first type for a first time period and a second column includes data of the first type for a second time period, and the rule defines a formula for a growth column. In an embodiment, the rule includes determining that metadata of a first column associates the first column with one of an output characterization or an input characterization. In an alternative embodiment, the rule includes determining that metadata of a first column indicates that the first column is capable of undergoing a particular statistical analysis.

An embodiment is directed to a system that includes a memory to store a set of data in a data structure having a plurality of rows and a plurality of columns, and metadata for the set of data. The system also includes a rules engine to determine one or more operations on particular columns of the set of data according to a set of rules, wherein a rule of the set of rules include conditions defined in terms of the metadata. In addition, the system includes a data analysis tool to perform the determined operations and a display device to present results of the determined operations as an additional column to the plurality of columns.

In various embodiments, the rule includes comparing a metadata attribute of a first column with a metadata attribute of a second column. In other embodiments, the rule includes comparing a metadata attribute of a first column with a metadata attribute associated with the rule. In addition in an embodiment, the metadata includes a dimension of a first column and a dimension of a second column, and the rule includes comparing the respective scopes (using the respective dimensions) of the first and second columns. In various embodiments, the rule includes comparing a first scope of a first column with a second scope of a second column. In still other embodiments, the rule determines that a first column includes data of a first type for a first time period and a second column includes data of the first type for a second time period, and the rule defines a formula for a growth column. In an embodiment, the rule includes determining that metadata of a first column associates the first column with one of an output characterization or an input characterization. In an alternative embodiment, the rule includes determining that metadata of a first column indicates that the first column is capable of undergoing a particular statistical analysis.

An embodiment is directed to a computer program product for determining one or more operations to perform on particular columns. The computer program product includes a computer readable storage medium having program code embodied therewith. The program code includes computer readable program code that is configured to import a set of data into a data structure in a memory. The data structure has a plurality of rows and a plurality of columns. In addition, the code is configured to import metadata for the set of data into in the memory. In addition, the code is configured to determine, using a rules engine, one or more operations on particular columns of the set of data according to a set of rules. The set of rules includes a condition defined in terms of the metadata. Further, the code is configured to input the determined operations into a data analysis tool, perform the determined operations using the data analysis tool, and present results of the operations on a display device as an additional column to the plurality of columns.

In various embodiments, the rule includes comparing a first scope of a first column with a second scope of a second column. In other embodiments, the rule determines that a first column includes data of a first type for a first time period and a second column includes data of the first type for a second time period, and the rule defines a formula for a growth column. In still other embodiments, the rule includes determining that metadata of a first column associates the first column with one of an output characterization or an input characterization.

DETAILED DESCRIPTION

According to various embodiments, a particular set of data is selected by a query. Operations or calculations that are likely to be useful with the particular set of data are then automatically determined. These "inferred" columns are added to the columns of data displayed as a result of the query. The inferred or suggested columns are thus made readily available to a user without the need for the user to define expressions or formulas associated with the inferred columns.

Figure 1:
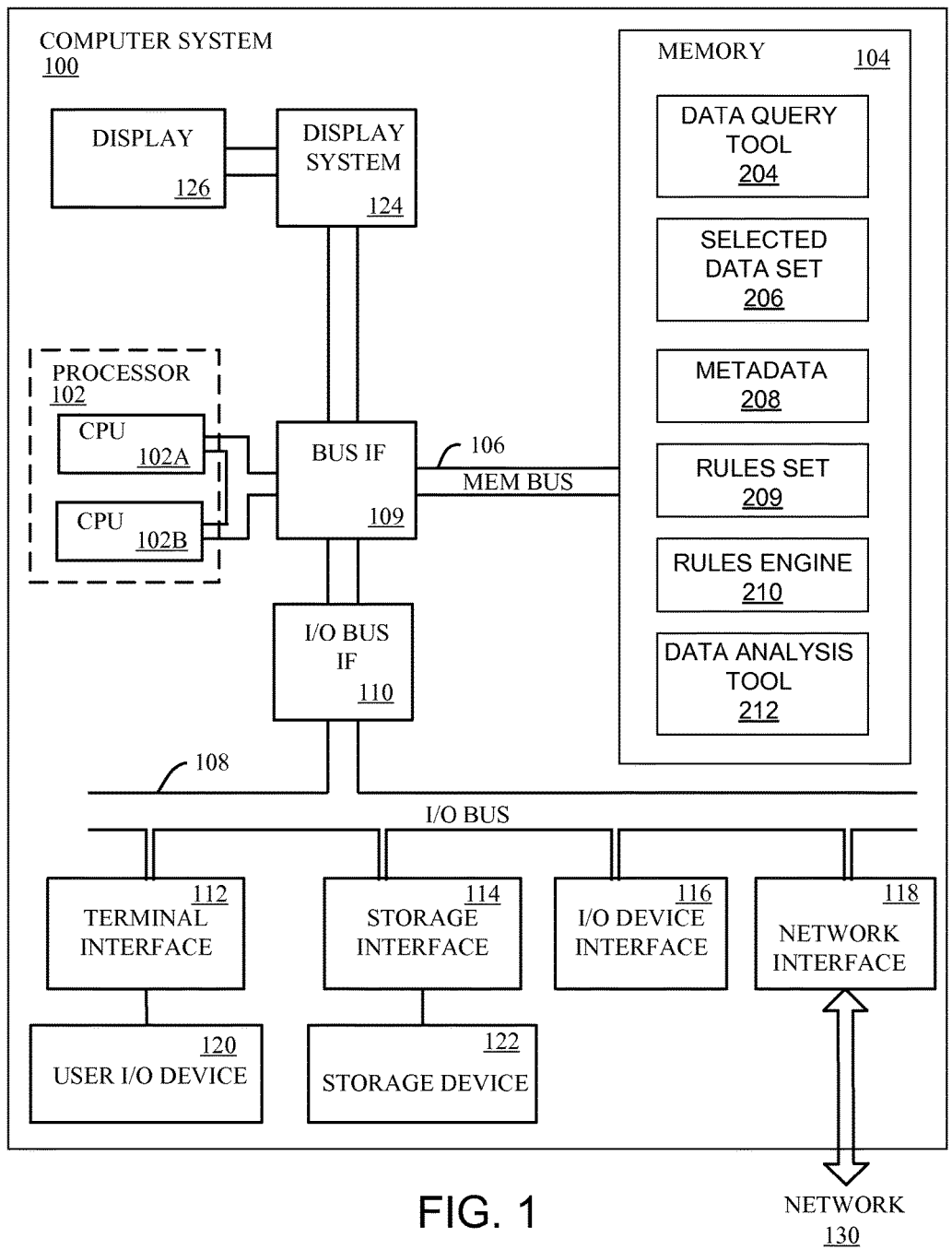
FIG. 1 depicts a high-level block diagram of an exemplary computer system in which various embodiments may be implemented.

FIG. 1 depicts a high-level block diagram of an exemplary computer system 100 in which various embodiments may be implemented. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In an embodiment, the computer system 100 may contain multiple processors; however, in another embodiment, the computer system 100 may alternatively include a single CPU. Each processor 102 executes instructions stored in the memory 104 and may include one or more levels of on-board cache.

In an embodiment, the memory 104 may include a random-access semiconductor memory, storage device, or storage medium (either volatile or non-volatile) for storing or encoding data and programs. In another embodiment, the memory 104 represents the entire virtual memory of the computer system 100, and may also include the virtual memory of other computer systems coupled to the computer system 100 or connected via a network. The memory 104 is conceptually a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor 102. Memory may be further distributed and associated with different CPUs or sets of CPUs, as is known in any of various so-called non-uniform memory access (NUMA) computer architectures.

The memory 104 may store all or a portion of the modules, units, and databases of a data query tool 204, selected data set 206, metadata 208, rule sets 209, rules engine 210, and data analysis tool 212. These programs and data structures are illustrated as being included within the memory 104 in the computer system 100, however, in other embodiments, some or all of them may be on different computer systems and may be accessed remotely, e.g., via a network. The computer system 100 may use virtual addressing mechanisms that allow the programs of the computer system 100 to behave as if they only have access to a large, single storage entity instead of access to multiple, smaller storage entities. Thus, while various components are illustrated as being included within the memory 104, in some embodiments, the data query tool 204, selected data set 206, metadata 208, rule sets 209, rules engine 210, and data analysis tool 212 are not necessarily all completely contained in the same storage device at the same time. Further, although the modules, units, and databases of the data query tool 204, selected data set 206, metadata 208, rule sets 209, rules engine 210, and data analysis tool 212 are illustrated as being separate entities in FIG. 1, in other embodiments some of them, portions of some of them, or all of them may be packaged together.

In an embodiment, the modules, units, and databases of the data query tool 204, selected data set 206, metadata 208, rule sets 209, rules engine 210, and data analysis tool 212 may include instructions or statements that execute on the processor 102 or instructions or statements that are interpreted by instructions or statements that execute on the processor 102 to carry out the functions as further described below. In another embodiment, the modules, units, and databases of the data query tool 204, selected data set 206, metadata 208, rule sets 209, rules engine 210, and data analysis tool 212 are implemented in hardware via semiconductor devices, chips, logical gates, circuits, circuit cards, and/or other physical hardware devices in lieu of, or in addition to, a processor-based system. In an embodiment, the modules, units, and databases of the data query tool 204, selected data set 206, metadata 208, rule sets 209, rules engine 210, and data analysis tool 212 may include data in addition to instructions or statements.

The computer system 100 may include a bus interface unit 209 to handle communications among the processor 102, the memory 104, a display system 224, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. In addition, one or more of the functions provided by the bus interface unit 209 may be on board an integrated circuit that also includes the processor 102.

The computer system 100 may include a display system 124, which may include a display controller, a display memory, or both. The display controller may provide video, audio, or both types of data to a display device 126. The display memory may be a dedicated memory for buffering video data. The display system 124 may be coupled with the display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. The display system 124 may be employed to display a user interface.

The I/O interface units support communication with a variety of storage and I/O devices. For example, the terminal interface unit 112 may be provided in order to support the attachment of one or more user I/O devices 120 via the I/O bus 108, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130. In various embodiments, the computer system 100 is capable of accessing databases, such as the databases 202 described below with respect to FIG. 2, that reside on data serving or other systems.

Although the computer system 100 shown in FIG. 1 illustrates a particular bus structure providing a direct communication path among the processors 102, the memory 104, the bus interface 209, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 is intended to depict the representative major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
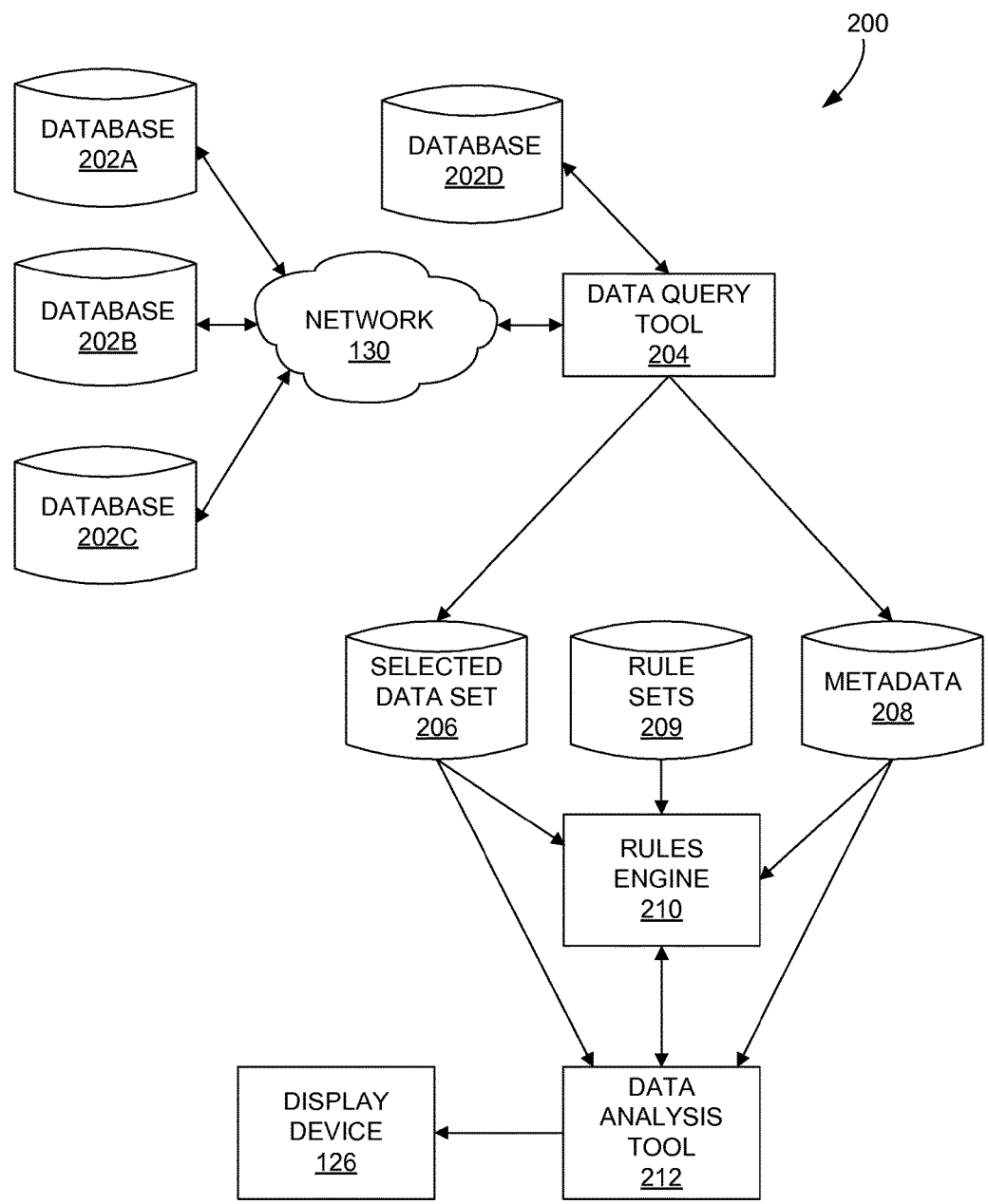
FIG. 2 is a block diagram of a system for providing inferred or suggested operations according to various embodiments.

FIG. 2 is a block diagram of a system 200 for providing inferred or suggested operations according to various embodiments. Data Analysis includes importing a set of data into the data analysis tool 212. The set of data may be imported from one of the databases 202A, 202B, 202C, or 202D, or a combination of two or more data bases. In FIG. 2, databases 202A, 202B, and 202C are depicted as being accessible via the network 130. For example, the databases 202A, 202B, and 202C may reside on a database server located within an organization or on a database server located in the "cloud." In other words, the network 130 may be a private or a public network. In FIG. 2, database 202D is depicted as being directly accessible by the data query tool 204. For example, the database 202D may be stored in the memory 104 of computer system 100 in some embodiments. The databases 202A, 202B, 202C, or 202D may be organized according to any known model, such as relational, flat, hierarchical, or object-relational. The databases 202A, 202B, 202C, or 202D may include table data structures and each table may include columns. Models for the databases 202A, 202B, 202C, or 202D may be represented by metadata. The metadata for a database may include catalogs, descriptions and names of tables and columns, data types, column sizes, relationships between tables and columns, mappings, views, and any other relevant information about the data. The metadata for a database may include a semantic understanding of a column relates to other columns in terms of dimension, functional dependency, or scope. In some embodiments, a user may be required to enter this metadata. In other embodiments, a tool may determine this metadata. In yet other embodiments, metadata may be determined in a hybrid approach in which some metadata is entered by a user and some is determined by a tool. This invention is equally applicable across all those approaches. Any metadata for a database may be available to the rules engine 210.

The data query tool 204 is a software application for creating queries. The data query tool 204 may be any known query tool. The data query tool 204 may include a user interface that that allows an analyst or other user to select or otherwise specify one or more databases and one or more data tables and columns within the specified tables. The data query tool 204 may perform queries written in Structured Query Language (SQL). In various embodiments, the data query tool 204 may allow a user to select data items that are at high level or represent an aggregate of granular data. For example, aggregate sales data at a company or product line level may represent granular sales data at a geographic or specific product or product feature level. The data query tool 204 may also allow the user to specify a mapping of the specified data into the data analysis tool 212. In addition, the data query tool 204 may allow the user to specify an operation on one or more columns. The specified data is referred to herein as the selected data set 206. Once a query is specified, the data query tool 204 reads the data from the specified database and maps the data into the selected data set 206. In addition, the data query tool 204 may read metadata associated with the specified data and write the metadata to metadata store 208. In some embodiments, the data query tool 204 may determine metadata that provides a semantic understanding of the data.

The data analysis tool 212 may include an expression editor or other similar facility. The expression editor enables an analyst to specify operations or formulas for calculations on columns of the selected data set in the selected data set 206. For example, one of the data columns imported may be added to, subtracted from, or multiplied or divided by another data column. Other example operations include mathematical and statistical operations, such as sum, average, count, max, min, standard deviation, and other similar operations. Operations may include conditions ("predicates"), statements, and operators, such as equal to, greater than, less than, AND, OR, NOT, BETWEEN, LIKE, IN, etc. In addition, operations may include parenthesis and brackets that specify the order of operations. Because the operations are created by hand, the task of specifying operations or formulas may be time consuming. In addition, an analyst may be required to recreate the same or similar operations or formulas for each data set, reducing his or her productivity. Further, determining suitable or appropriate operations or formulas may require the skill of an experienced business analyst and it is not uncommon for someone lacking the expertise of an experienced analyst to want to obtain insight from the data.

Figure 3:
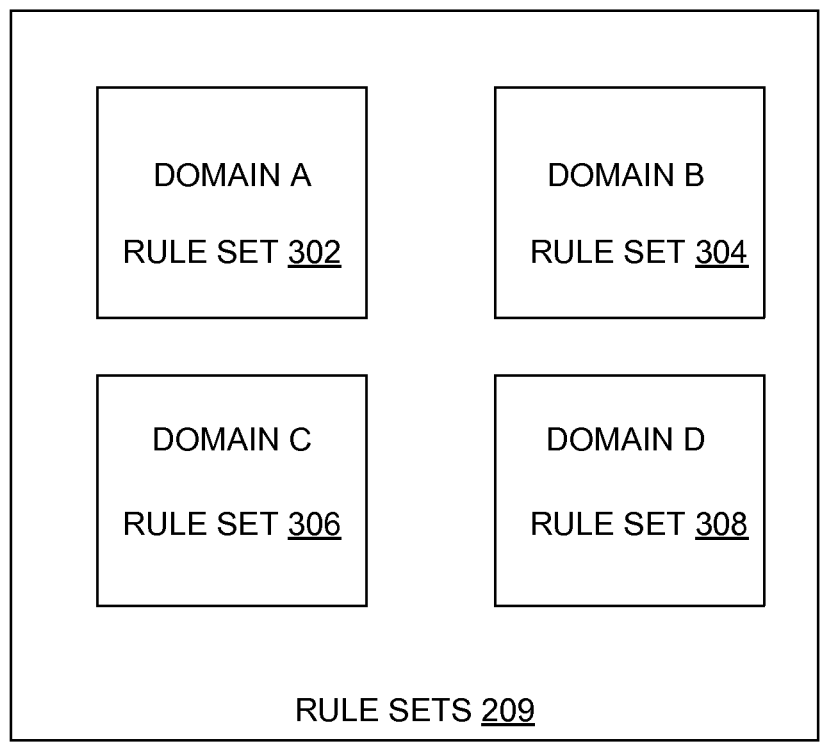
FIG. 3 is a block diagram of an example of rule sets

To address these problems, the system 200 includes the rule sets 209 and rules engine 210. Operations or formulas that may be inferred or suggested for use may be stored in the rule sets 209. Referring to FIG. 3, a block diagram of an example of rule sets 209 is shown. The example rule sets 209 includes four sets of rules for four domains (A, B, C, and D). For example, domain A may be a financial domain and rule set 302 may include financial operations or formulas. Domain B may be a sales domain and rule set 304 may include sales operations or formulas. Domain C may be a human resources domain and rule set 306 may include human resources operations or formulas. Domain D may be an operations domain and rule set 308 may include production and inventory operations or formulas. These are merely examples of domains. Any suitable domain and associated rule set may be provided.

The rules engine 210 applies rules in order to determine operations or formulas to suggest to a user. These rules may be in the form of "if one or more conditions or predicates are true, then suggest a particular operation or formula to the user." The rules may be specified in a programming language similar to or the same as the language used to express rules in the data analysis tool 212, i.e., the rules may include conditions, statements, operators, and parenthesis or brackets. The conditions are expressed in terms of the metadata 208 for the selected data set 206. The metadata 208 may include data types and column attributes, including relationships between tables and columns.

Each column has a name (or identifier) and a data type. A data type may be character, integer, real, data, Boolean, or any other known data type. Each column may have associated attributes.

Attributes of a column may indicate that the column is associated with one or more dimensions. A dimension may be a collection of related columns or identifiers. Columns in a dimension may have some sort of structure and attributes of a column may indicate a structural or organizational relationship within a dimension. As one example, a column named "year" may belong to a "time" dimension along with "quarter," "month," and "day" columns. The "year" column may have a hierarchical relationship to the other columns in the time dimension. As another example, "country," "state," "city," "zip code," and "street" may belong to a "geographic" dimension. The "city" column may have a hierarchical relationship to the other columns in the "geographic" dimension. Hierarchical relationships may be defined in terms of "levels." Country is at a higher level than state. State is at a higher level than city, and so on. As yet another example, "product line," "product," "size," and "options" may belong to a "products" dimension. The "size" and "option" columns may have a hierarchical relationship with the "product" column, but a non-hierarchical relationship with each other. In an additional example, a "sales" dimension may include columns identifying purchase details, such as "units sold," "store of sale," and "revenue."

Various columns may have the same or different scopes. Scope may be defined in a data model and specified in the metadata 208. Scope may be defined in terms of levels. Scope may defined according to common or meaningful usage. For example, the scope of a population column might be the population for state, city, or country levels. However, the scope of a population column probably would not include individual restaurant locations. Inside a database data may be stored with sufficient granularity so that data of a particular dimension may be combined or calculated to output data at a desired level. Accordingly, scope may be the set of levels, in a dimension, where the output data is available and meaningful. Examples of scope for some example dimensions are set forth in Table 1.

TABLE 1

| Level | Dimension | | | |
|---|---|---|---|---|
| | Population | Revenue | Target Sales | Employee |
| Country | X | X | X | X |
| City | X | X | X | X |
| State | X | X | X | X |
| Group of Restaurants | | X | X | X |
| Restaurant | | X | X | X |
| Year | | X | X | |
| Quarter | | X | X | |
| Month | | X | X | |
| Day | | X | | |
| Grade 1 | | | | X |
| Grade 2 | | | | X |
| Grade 3 | | | | X |

Scope may be explicitly or implicitly defined in terms of levels. As an example, the scope of a target sales column might explicitly be at the individual restaurant levels, but the scope of a target sales column implicitly includes per town, state, and country levels, as well as per year, quarter, and month levels. However, the scope of a target sales column at the individual restaurant levels may not implicitly include a per day level.

According to various embodiments, columns are automatically inferred or suggested to a user. The inferred columns are the result of operations or calculations on two or more columns in the selected data set 206. The inferred columns are meaningful if the scopes of the columns used in the expression are the same or at least overlap. Using the examples of Table 1, it may be seen that an expression that combines population and revenue is meaningful if calculated at the country, state, and city levels, but not at the restaurant location level. The restaurant location level is not in the scope of the population column. In other words, revenue per capita is meaningful at the city level, but not at the restaurant level. Similarly, consider an expression that calculates revenue as a percentage of target sales. Again using the examples of Table 1, the revenue as a percentage of target sales calculation is meaningful for country, state, town, and restaurant location levels, and a year, quarter, and month time levels, but not at a day level. The day level is not in the scope of the target sales column. Any proposed calculation between population or revenue, or target sales and employee grade is generally meaningless where there is no overlap in scope. Accordingly, scope may be used to suppress the generation of calculations that would be meaningless, confusing, and even misleading. It should be understood that while the use of scope in rules set 209 according to various embodiments may result in more useful inferred or suggested calculations, the use of scope in a rule is not required in all embodiments.

In some embodiments, the data query tool 204 allows viewing of a column at different levels. In these embodiments, the rules set 209 may include rules that generate calculations when the columns involved have "compatible" scopes, e.g., the scopes are the same or at least overlap. Columns that are calculated by these rules have an inferred scope. These columns may be displayed in the user interface when a user selects a viewing level that is within the inferred scope. In other embodiments, the data query tool 204 allows viewing of a column at only one level. In these embodiments, the data query tool 204 allows viewing of a column only at the level that it was extracted from the database 202. In this case, each column has one specific level, and the rules set 209 may include rules that only generate calculations where the levels of the columns have compatible scope.

Figure 5:
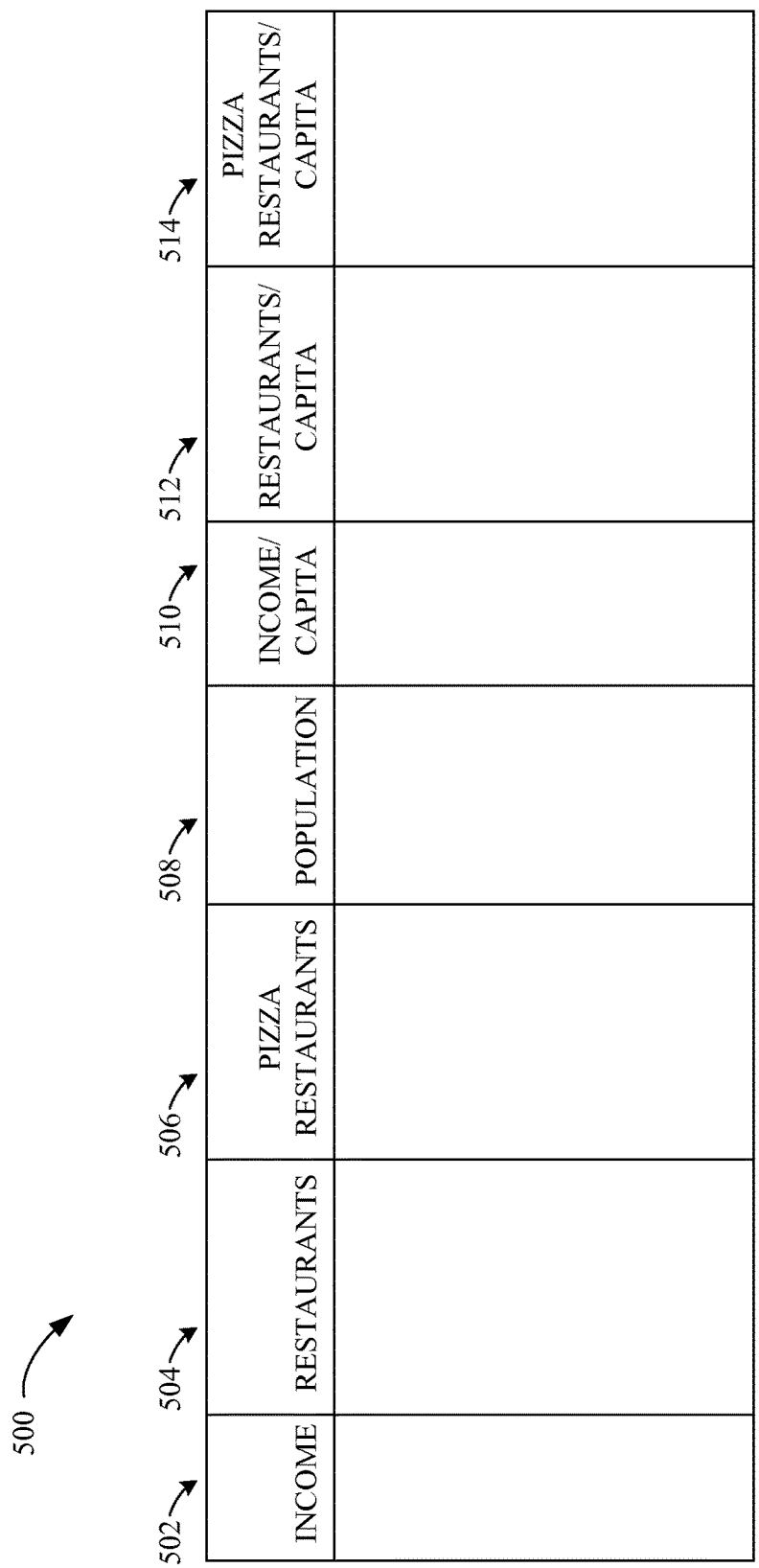
FIG. 5 is a table having columns of a selected data set and inferred or suggested columns according to various embodiments.

Conditions evaluated by the rules engine 210 may include a condition that a first column has the same scope as a second column. FIG. 5 shows a table 500 that has columns for "income" 502, "restaurants" 504, "pizza restaurants" 506, and "population" 508 which correspond to a selected data set 206, according to one example. In this example, there are three instances of a first condition: (a) a first instance that column 502 (income) has the same scope as column 508 (population); (b) a second instance that column 504 (restaurants) has the same scope as column 508 (population); (c) and a third instance that column 506 (pizza restaurants) has the same scope as column 508 (population). In addition in this example, there are three instances of a second condition: (a) a first instance that column 502 has the same data type as column 508; (b) a second instance that column 504 has the same data type as column 508; (c) and a third instance that column 506 has the same data type as column 508. Further in this example, there is a rule that specifies an operation is to be performed if the first and second conditions are true. Specifically, if the first and second columns have the same scope and data type, an operation to divide the first column by the second column is performed. In this example, the first and second conditions are true for each of the instances and division operations are performed. In this example, income, restaurants, pizza restaurants, and population are all integers. In addition in this example, income, restaurants, pizza restaurants, and population are all defined to have the same scope. The results of the division operations are provided in calculated columns "income/capita" 510, "restaurants/capita" 512, and "pizza restaurants/capita" 514. The format of the calculated columns may be an integer. In another example where the data is real, the format of the calculated columns may be numeric with a precision of two decimal places.

The operation or calculation associated with a particular rule is one that has been determined as likely to be useful. In the example of FIG. 5, an operation that produces a per capita metric is an operation that has been determined as likely to be useful. Particular operations may be determined by an experienced analyst based on that analyst's experience and stored in the rules set 209.

The calculated columns are presented to the user in the user interface of the data analysis tool 212. If the user considers the calculated columns "income/capita" 510, "restaurants/capita" 512, and "pizza restaurants/capita" 514 to, in fact, be useful, no further action is required. The user's productivity may improve because the user is not required to repeatedly enter formulas and operations. And productivity may improve for the inexperienced user because he or she is not required to determine, in the first instance, what operations may be useful. On the other hand, if the user considers a particular calculated column to not be useful, the user merely deletes the column. Deleting a column is typically a fast, easily performed step. On balance, the time saved in not having to input operations may generally outweigh the small amount of time deleting calculated columns not deemed useful.

Particular operations may be determined to be more or less likely to be useful based on user input. Specifically, a particular rule may be stored in the rules set 209. As the system is used, the particular rule may suggest an inferred calculation to users based on a query. If the user does not delete the particular rule, the rule is deemed to be useful. Each time a rule is deemed useful, a count may be incremented. On the other hand, if the user deletes the rule, the rule is deemed to be not useful. Each time a rule is deemed not useful, a count may be decremented. After sufficient data usefulness is gathered, rules deemed more useful may be displayed more prominently, i.e., they may be highlighted or displayed in order of usefulness rank. Rules deemed less useful may be displayed less prominently or not displayed at all.

As mentioned, each column has associated attributes, which may include a dimension attribute. A dimension attribute may specify a semantic meaning for the column. In various embodiments, a dimension may specify a collection of columns that are of a particular type that is used as one variable in an operation or calculation. For example, a dimension may include a collection of columns that may be characterized as "inputs." For instance, columns for hours worked or a quantities of raw materials. Another dimension may include a collection of columns that may be characterized as "outputs." For instance, columns for intermediate or final products produced. A rule in the rules sets 209 may specify that if the selected data set 209 includes a first column having an input attribute and a second column having an output attribute, then a column having a productivity ratio (output/input) may be automatically calculated and suggested to the user.

In various embodiments, a dimension may specify a collection of columns that are of a particular type that may be susceptible to or capable of undergoing a particular statistical analysis. For example, a column may specify outputs for similar production units. For instance, a column may includes data for sales by store or products by factory. A rule in the rules sets 209 may specify that if the selected data set 209 includes a first column having a susceptible-to-statistical analysis attribute, then columns having a total number of values, minimum value, maximum value, average value, and standard deviation value may be automatically calculated and suggested to the user.

As another example, if a column is found with the data type of date, then rule in the rules sets 209 may specify that for every other column which has the same scope and is a numeric measure, a calculation is to be generated for an inferred column called "<name of other column> Growth." The formula for the inferred column includes an expression of (<other column> filtered to year N–<other column> filtered to year N–1)/abs(<other column> filtered to year N–1) (c) with a format of a percentage with 1 decimal place. Where "abs" represents the absolute value. For instance, if the other column is "Sales," the formula for "Sales Growth" is ((Sales for 2013)–(Sales for 2012))/(Sales for 2012).

Figure 4:
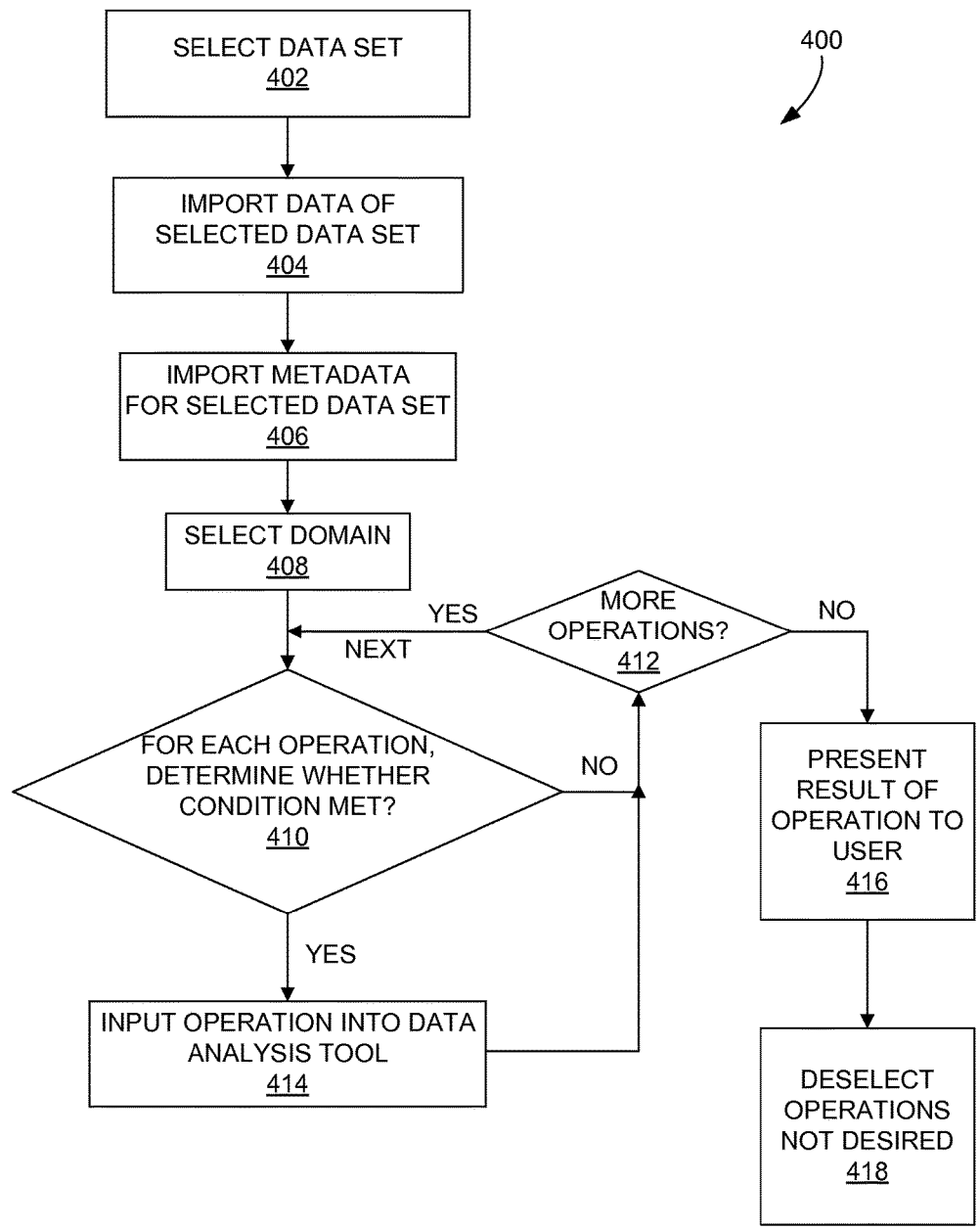
FIG. 4 is flowchart diagram of a method for inferring or suggesting operations according to various embodiments.

FIG. 4 is flowchart diagram of a method 400 for inferring or suggesting operations according to various embodiments. In operation 402, a query is directed to one or more databases 202 to select a selected data set 206. In operation 404, data of the selected data set 206 may be imported for use in the data analysis tool 212. Operation 404 may include operations on the selected data set 206. In operation 406, metadata for the selected data set 206 may be imported for use by the rules engine 210. In operation 408, a domain may be selected from the rule sets 209. For example, one or more of the domains 302-308 may be selected. In operation 410, each rule in the selected domain is evaluated with respect to columns of the selected data set 206. Operation 410 determines whether the one or more conditions for each rule are met. If all conditions for a rule are not met, it is determined in operation 412 if there are more rules to evaluate. If there are more rules to evaluate, operation 410 is repeated for a next rule. On the other hand, if all conditions for a rule are met, in operation 414, the operation or formula provided in the rule is automatically input to the data analysis tool 212. In operation 412, if it is determined that all rules have been evaluated, then in operation 416, the results of each of the rules input to the data analysis tool 212 in operation 414 are presented to the user. The results may be presented in a user interface as a one or more inferred columns. In operation 418, a user may deselect any operations not desired by deselecting the associated inferred column.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. In particular, the terms "present invention" or "invention," as used herein, is used to refer to examples or embodiments of the concepts described in this detailed description. The scope of the invention is defined by the claims. The detailed description is to be construed as exemplary only and does not describe every possible embodiment of the invention.

What is claimed is:

1. A system comprising:
    a memory to store a set of data in a data structure having a plurality of rows and a plurality of columns, and metadata for the set of data;
    a rules engine to determine one or more operations on particular columns of the set of data according to a set of rules, wherein a rule of the set of rules includes conditions defined in terms of the metadata, wherein the rule includes comparing a metadata attribute of a first column with a metadata attribute of a second column, and
    wherein the rules engine determines a count for one or more rules in the set of rules, each count having an associated rule in the one or more rules, and wherein each count is based on a number of times the rules engine has generated a column using the associated rule;
    a data analysis tool to perform the determined operations and to rank the one or more rules based on their associated counts; and
    a display device to present results of the determined operations as an additional column to the plurality of columns and to display the one or more rules to a user in an order consistent with their ranking.

2. The system of claim 1, wherein the rule further includes comparing the metadata attribute of the first column with a metadata attribute associated with the rule.

3. The system of claim 1, wherein the metadata includes a dimension of the first column and a dimension of the second column, and the rule further includes comparing the respective dimensions of the first and second columns.

4. The system of claim 1, wherein the rule further includes comparing a first scope of the first column with a second scope of the second column.

5. The system of claim 1, wherein the rule further includes determining that the first column includes data of a first type for a first time period and the second column includes data of the first type for a second time period, and the rule defines a formula for a growth column.

6. The system of claim 1, wherein the rule includes determining that metadata of the first column associates the first column with one of an output characterization or an input characterization.

7. The system of claim 1, wherein the rule includes determining that metadata of the first column indicates that the first column is capable of undergoing a particular statistical analysis.

8. A computer program product for determining one or more operations to perform on particular columns, the computer program product comprising a computer readable storage medium having program code embodied therewith, the program code comprising computer readable program code configured to:
    import a set of data into a data structure in a memory, the data structure having a plurality of rows and a plurality of columns, wherein the set of data includes a first column and a second column;
    import metadata for the set of data into the memory;
    determine, by a rules engine, one or more operations on particular columns of the set of data according to a set of rules, wherein a rule of the set of rules include a condition defined in terms of the metadata, the rule including comparing a metadata attribute of the first column with a metadata attribute of the second column;
    input the determined operations into a data analysis tool;
    perform the determined operations by the data analysis tool; and
    present results of the operations on a display device as an additional column to the plurality of columns;
    determine, by the rules engine, a count for one or more rules in the set of rules, each count having an associated rule in the one or more rules, wherein each count is based on a number of times the rules engine has generated a column using the associated rule;
    rank the one or more rules based on their associated counts; and
    display the one or more rules to a user in an order consistent with their ranking.

9. The computer program product of claim 8, wherein the rule further includes comparing a first scope of the first column with a second scope of the second column.

10. The computer program product of claim 8, wherein the rule further includes determining that the first column includes data of a first type for a first time period and the second column includes data of the first type for a second time period, and the rule defines a formula for a growth column.

11. The computer program product of claim 8, wherein the rule includes determining that metadata of the first column associates the first column with one of an output characterization or an input characterization.

* * * * *